(12) United States Patent
Wu et al.

(10) Patent No.: US 7,256,941 B2
(45) Date of Patent: Aug. 14, 2007

(54) LENS ARRAY

(75) Inventors: Rong Yaw Wu, Hsin-Tren (TW); Chen Sheng-Li, Hsin-Tren (TW); Shih Che Chen, Hsin-Tren (TW)

(73) Assignee: Pixon Technologies Corp., Taipei (TW)

( * ) Notice: Subject to any disclaimer, the term of this patent is extended or adjusted under 35 U.S.C. 154(b) by 20 days.

(21) Appl. No.: 11/182,205

(22) Filed: Jul. 15, 2005

(65) Prior Publication Data

US 2007/0014022 A1  Jan. 18, 2007

(51) Int. Cl.
G02B 27/10 (2006.01)
G02B 3/00 (2006.01)
G03B 27/72 (2006.01)
G03B 17/48 (2006.01)

(52) U.S. Cl. .................. 359/621; 359/622; 359/652; 355/20; 396/429

(58) Field of Classification Search ............. 359/619, 359/621, 622, 626, 652–654, 455–457; 385/34, 385/124; 355/20, 46; 396/429, 327
See application file for complete search history.

(56) References Cited

U.S. PATENT DOCUMENTS

| 3,605,593 | A | * | 9/1971 | Anderson | 355/20 |
| 5,731,899 | A | * | 3/1998 | Meyers | 359/621 |
| 5,796,522 | A | * | 8/1998 | Meyers | 359/626 |
| 5,812,322 | A | * | 9/1998 | Meyers | 359/621 |
| 5,822,125 | A | * | 10/1998 | Meyers | 359/621 |
| 5,973,844 | A | * | 10/1999 | Burger | 359/622 |
| 6,124,974 | A | * | 9/2000 | Burger | 359/621 |
| 6,381,072 | B1 | * | 4/2002 | Burger | 359/622 |

* cited by examiner

*Primary Examiner*—Loha Ben (57) ABSTRACT

An optical lens array featuring low cost and simple manufacture. The lens array has two lens sections separated by spacers, with a stop on the front surface. An optional wraparound frame protects the lens array from external light. The spacers and stop, as well as the optional frame, are made of black polymer to block unwanted scattered or external light. The lens sections, stop, spacers, and frame can all be made by injection-molding. Notches, locating holes, posts, and ears serve to orient and align the parts, and to prevent incorrect assembly.

17 Claims, 12 Drawing Sheets

LENS ARRAY

BACKGROUND OF THE INVENTION

1. Field of the Invention

The present invention relates to optics. More specifically, the present invention discloses an array of lenses for high-resolution imaging of a surface.

2. Description of the Prior Art

Figure 1:
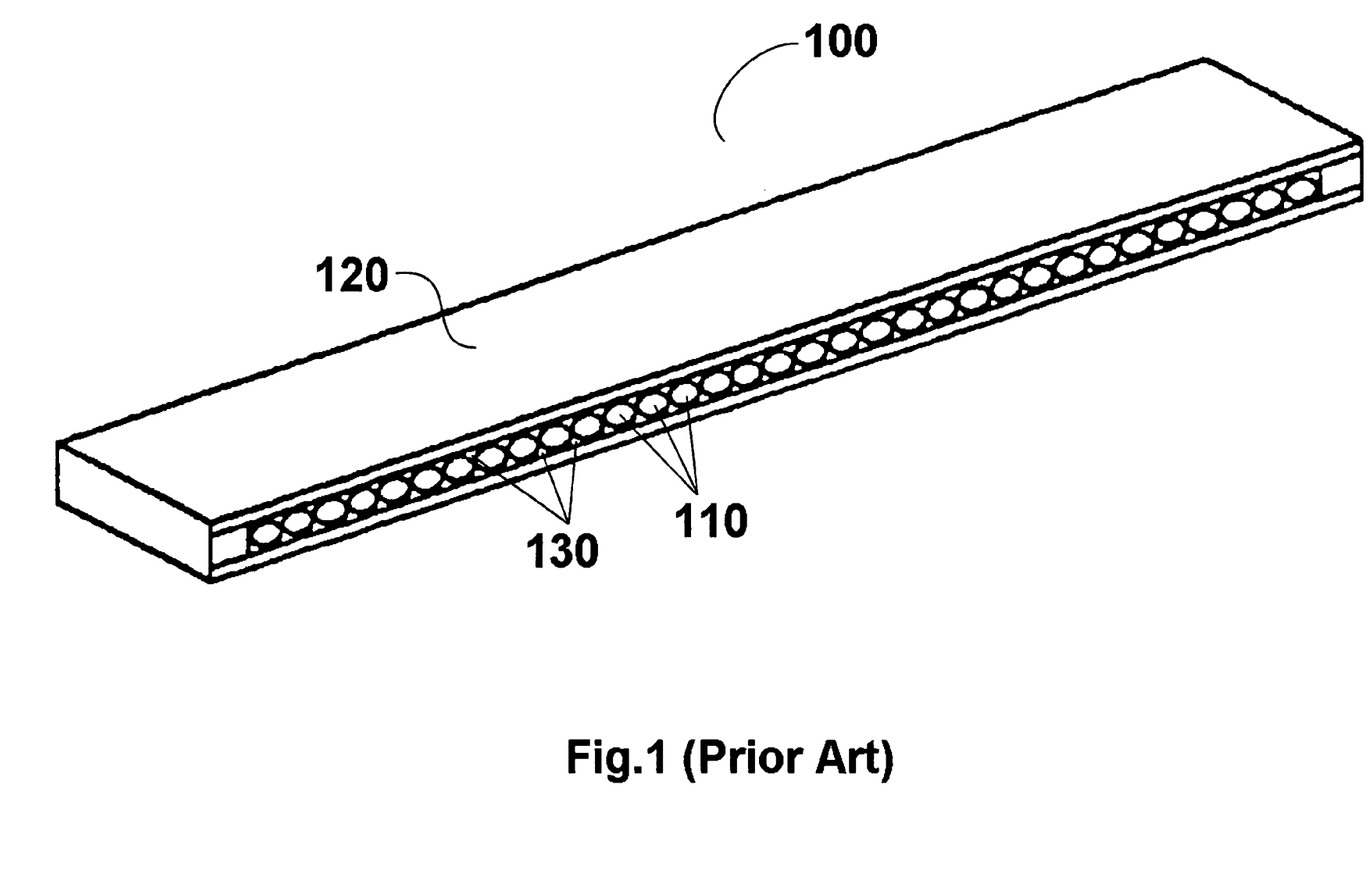
FIG. 1 is a perspective drawing of a prior art rod lens array.

Traditionally, the lens for a one to one imaging optical scanner is a rod lens array. Please refer to FIG. 1, a perspective drawing of a prior-art rod lens array 100. The rod lens array 100 is constructed from a plurality of fiber optic rod lenses 110. Each individual fiber optic rod lens 110 is cut from a fiber optic glass strand, and its ends must be polished. The plurality of fiber optic rod lenses 110 are then arranged side by side, in a row or multiple rows with their optical axes in parallel, in a frame 120 and held in place by an adhesive layer 130. The fiber optic rod lenses 110 are typically made from GRIN (graduated index) fibers, with the refractive index of the glass carefully controlled during manufacture to have a graduated refractive index that decreases radially from the central axis to the edge.

However, this type of lens is expensive to manufacture. GRIN type fiber optic glass strands are expensive in and of themselves; cutting and polishing the strands to precise lengths to form fiber optic rod lenses 110, assembling them so that their axes are precisely parallel in the frame 120, and gluing the fiber optic rod lenses 110 are all precision steps for which entire technologies have had to be developed in order to satisfy requirements.

In addition, a major disadvantage of this type of lens is that because of the number of lenses and the difficulty in orienting them, it is not practical to shape the ends of the lenses so that they can magnify the surface that they are imaging; flat ends are used. In order to increase the imaging resolution, it is necessary to use larger numbers of smaller-diameter rod lenses 110, limiting the maximum resolution and driving up the costs as the desired resolution increases. Furthermore, suppliers for the necessary GRIN fiber optic strands are limited, and thus the base materials themselves are expensive.

Therefore there is need for an improved lens array for which materials are substantially cheaper and which is simpler to manufacture, and which can have increased resolution without substantially increasing costs.

SUMMARY OF THE INVENTION

To achieve these and other advantages and in order to overcome the disadvantages of the conventional method in accordance with the purpose of the invention as embodied and broadly described herein, the present invention provides a lens array where pluralities of lens faces are molded into surfaces of polymer bars, thus simplifying manufacturing, using inexpensive materials, and aligning the lenses without requiring significant manufacturing infrastructure.

The present invention further provides a lens array where the lens faces are configurable at the time of design to support increased resolution.

These and other objectives of the present invention will become obvious to those of ordinary skill in the art after reading the following detailed description of preferred embodiments.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Reference will now be made in detail to the preferred embodiments of the present invention, examples of which are illustrated in the accompanying drawings. Wherever possible, the same reference numbers are used in the drawings and the description to refer to the same or like parts.

Figure 2:
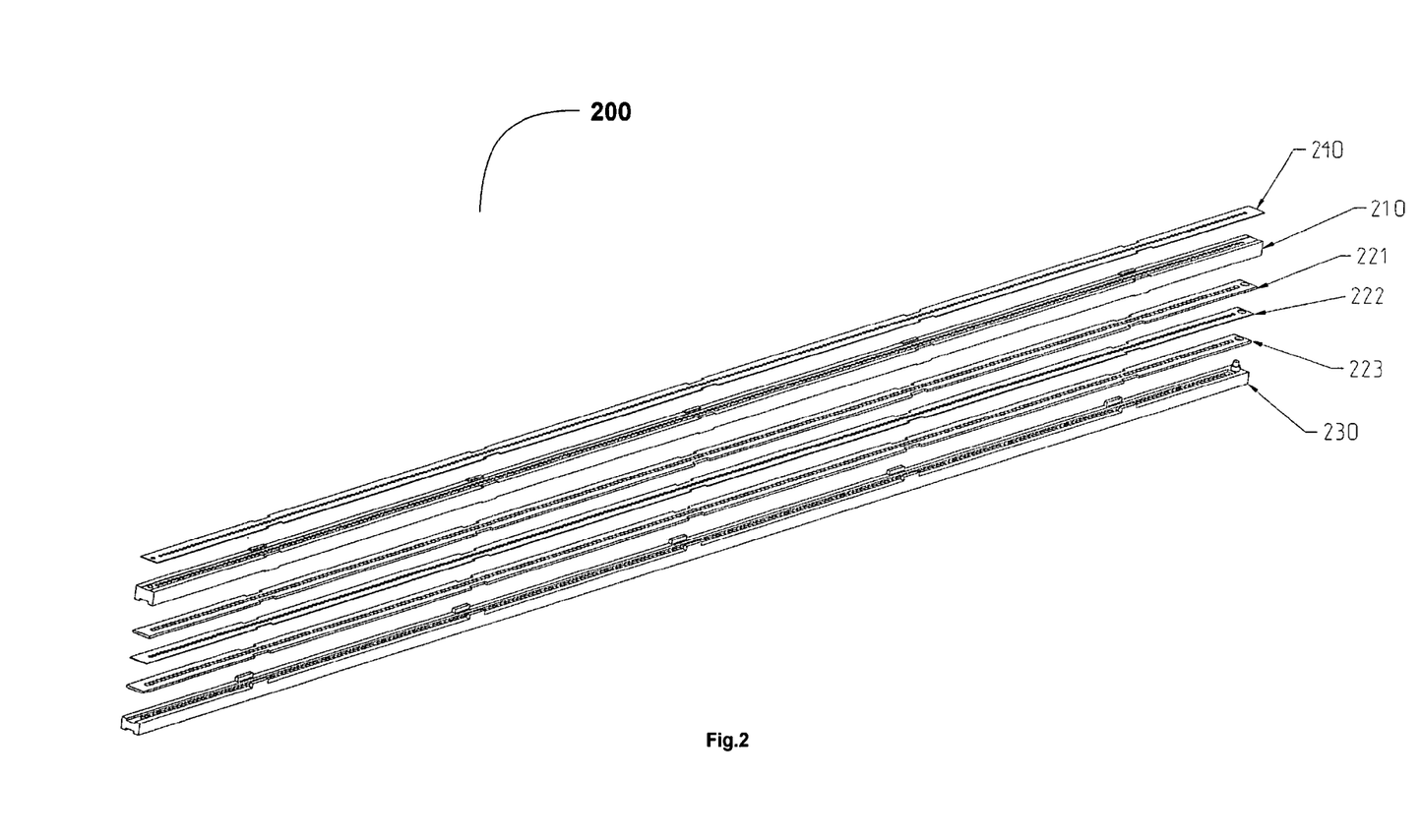
FIG. 2 is an exploded perspective drawing of a lens array of the present invention.

Please refer to FIG. 2, which shows an exploded perspective drawing of a lens array of the present invention. The lens array 200 of this embodiment consists of a stop 240, a first lens section 210, three spacers 221,222,223, and a second lens section 230. Each component is discussed in further detail below. The number of spacers may vary between embodiments depending on design considerations. Only one spacer is required, but two or more may be used; the example embodiment uses three spacers. A frame (not shown) may optionally enclose the perimeter of the assembled lens array 200, providing support, mounting, and protection, and blocking external light.

Figure 6A:
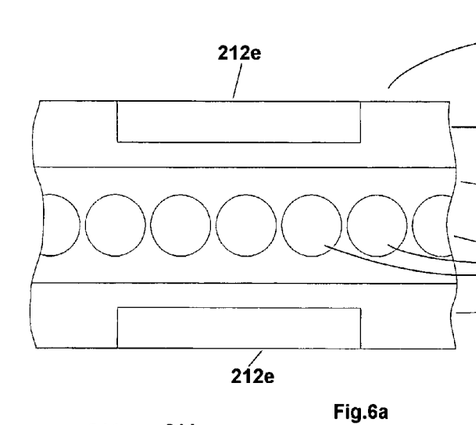
FIG. 6a is a drawing of a second surface of a first lens section for a lens array of the present invention with the view in line with the optical axis.
Figure 6B:
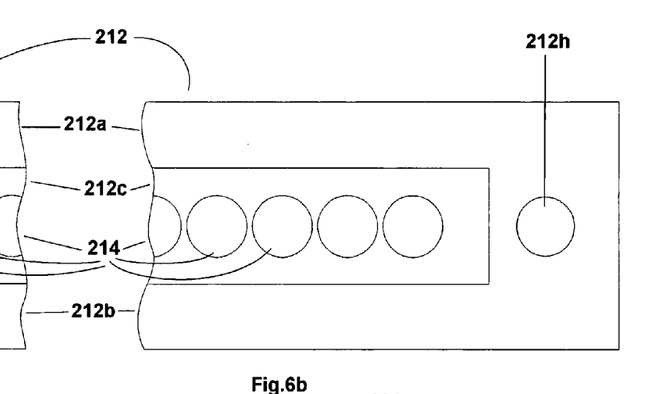
FIG. 6b is a drawing of an end of a second surface of a first lens section for a lens array of the present invention with the view in line with the optical axis.

Please refer momentarily to FIG. 6b, which is a cross-section drawing of a lens array of the present invention in relation to a printed circuit board. This figure will be discussed in greater detail later; until then, note the distance 201 between the optical axes of two adjacent lens surfaces, referred to hereafter as the inter-axis distance 201.

Figure 3A:
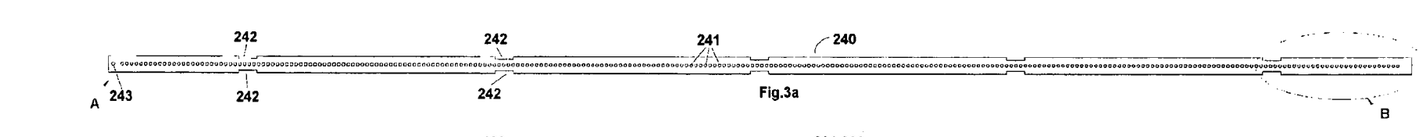
FIG. 3a is a drawing of a surface of a stop for a lens array of the present invention with the view in line with the optical axis.
Figures 10A, 10B:
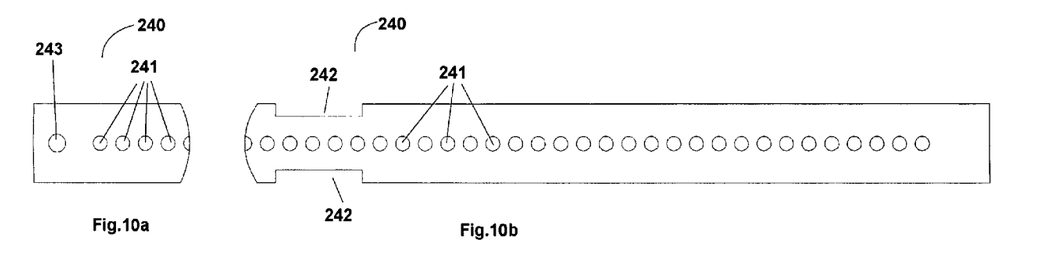
FIG. 10a is a detail drawing of a first end of a surface of a stop for a lens array of the present invention with the view in line with the optical axis.
FIG. 10b is a detail drawing of a second end of a surface of a stop for a lens array of the present invention with the view in line with the optical axis.

Please refer to FIG. 3a, which is a drawing of a surface of a stop for a lens array of the present invention with the view in line with the optical axis, in combination with FIG. 10a and FIG. 10b, which are detail drawings of the same part as marked in FIG. 3a by A and B respectively. The stop 240 has a plurality of holes 241 organized such that the centers of the holes form a line down the center of the spacer. The first plurality of holes 241 are spaced apart equally by the inter-axis distance. The first plurality of holes 241 are circular, oval, cylindrical, or conical. Along the edges of the stop 240, a plurality of notches 242 is positioned to mate with a plurality of ears 211e of the first surface 211 of the first lens section 210. A locating hole 243 near one end of the stop 240 is sized and positioned to fit around the phasing post 351 of the first lens array.

Figure 3B:
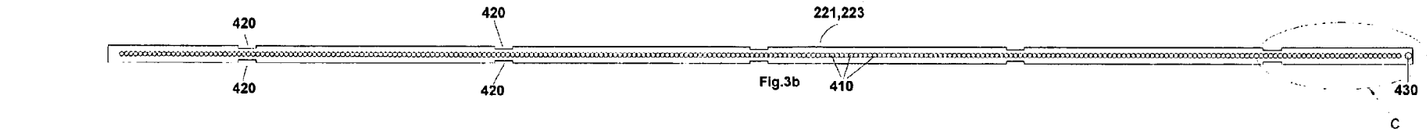
FIG. 3b is a drawing of a surface of a spacer for a lens array of the present invention with the view in line with the optical axis.
Figure 10C:
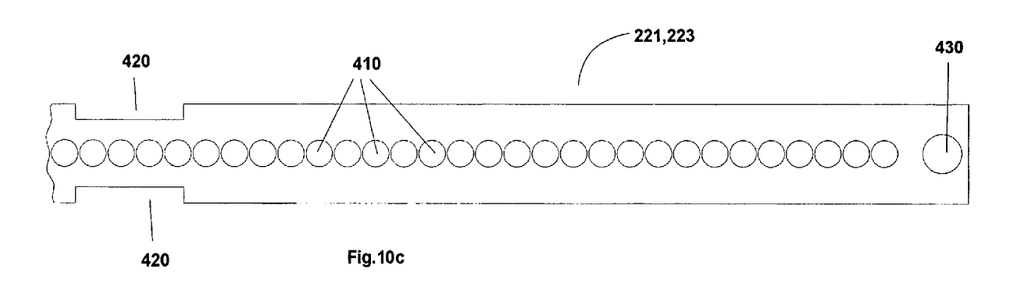
FIG. 10c is a detail drawing of an end of a surface of a spacer for a lens array of the present invention with the view in line with the optical axis.

Please refer to FIG. 3b, which is a drawing of a surface of a spacer for a lens array of the present invention with the view in line with the optical axis, in combination with FIG. 10c, which is a detail of one end of the part as marked in FIG. 3b by C. The third spacer 223 is substantially identical to the first spacer 221 and is not shown separately here. The first and third spacers 221,223 have a plurality of holes 410 organized such that the centers of the holes form a line down the center of the spacer. The holes 410 are spaced apart equally by one inter-axis distance 201. The holes 410 may be tapered right conic frustums or they may be cylindrical. Along the sides of the spacer 220, a plurality of notches 420 is positioned to mate with the ears 211e of the lens arrays. A locating hole 430 near one end of the first and third spacers 221,223 is sized and positioned to fit around the phasing post 350 of the second lens array. The locating hole 430 and the plurality of notches 420 serve to locate and hold the first and third spacers 221,223 in alignment with the first and/or second lens sections 210,230 so that the centers of the holes 410 are centered on the lens axes. The minimum diameter of the holes 410 is the outer diameter of the lens faces molded into the surface against which the spacer is disposed.

Figure 3C:
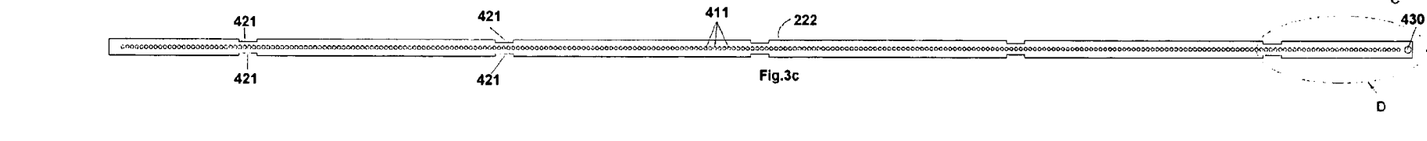
FIG. 3c is a drawing of a surface of a spacer for a lens array of the present invention with the view in line with the optical axis.
Figure 10D:
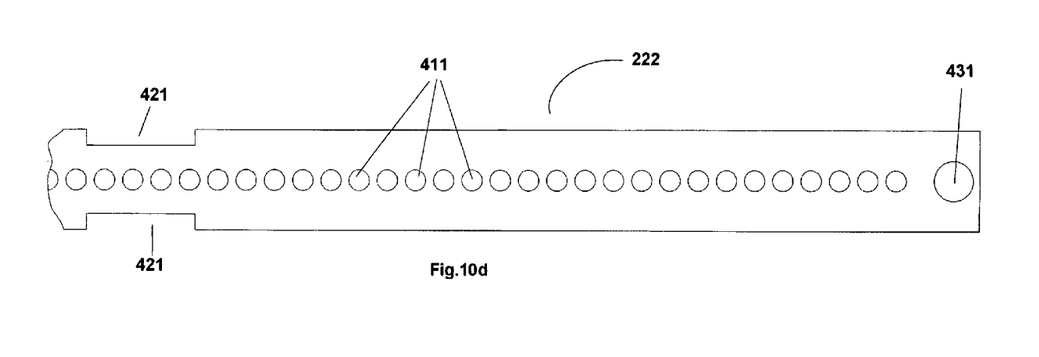
FIG. 10d is a detail drawing of an end of a surface of a spacer for a lens array of the present invention with the view in line with the optical axis.

FIG. 3c is also a drawing of a surface of a spacer for a lens array of the present invention with the view in line with the optical axis, in combination with FIG. 10d, which is a detail of the same part, noted in FIG. 3c by D. The spacer 222 is similar to the first spacer 221 and third spacer 223 except that the diameter of the plurality of holes 411 are smaller. The plurality of holes 411 are spaced apart equally by one inter-axis distance 201. The notches 421 are the same size as the notches 420 of the spacers 221,223.

Figure 4A:
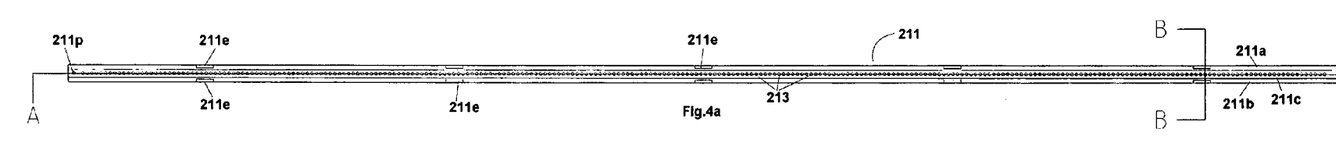
FIG. 4a is a drawing of a first surface of a first lens section for a lens array of the present invention with the view in line with the optical axis.

Please refer to FIG. 4a, which is a drawing of a first surface of a first lens section for a lens array of the present invention with the view in line with the optical axis. Two section lines A-A and B-B are marked for use in FIG. 4c and FIG. 5 respectively. FIG. 4a shows the first surface 211 of the first lens section 210. The first surface 211 has a channel 211c down the center of the lens, and a first plurality of lens surfaces 213 are formed with their optical axes in line, spaced apart equally by one inter-axis distance 201. The line of the centers of the first plurality of lens surfaces 213 in this example embodiment is along the center line of the channel 211c. A plurality of ears 211e is formed along the edges 211a, 211b of the first lens surface 211 of the first lens section 210, such that the ears 211e are sized and spaced to mate with the notches 242 of the stop 240. The width of the first lens section 210 is substantially the same as the width of the stop 240. A first post 211p is located at one end of the first lens section 210, sized and positioned to mate with the locating hole 243 of the stop 240. A surface of the stop 240 fits snugly against the faces of the edges 211a, 211b with notches 242 mating to ears 211e so that the plurality of holes 241 of the stop 240 are lined up with their centers on the optical axes of the first plurality of lens surfaces 213. The locating hole 243 and the plurality of notches 242 serve to locate and hold the stop 240 in alignment with the first lens section 210 so that the centers of the holes 241 are substantially on the optical axes of the first plurality of lens surfaces 213.

Figures 4B, 4C:
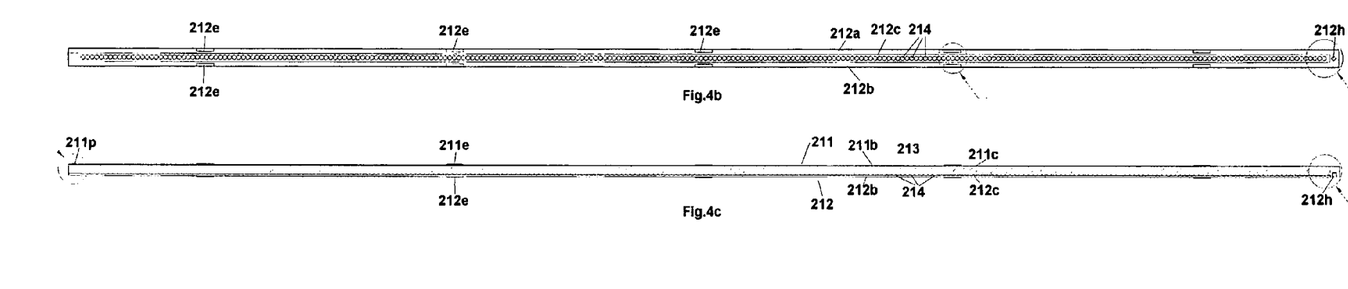
FIG. 4b is a drawing of a second surface of a first lens section for a lens array of the present invention with the view in line with the optical axis.
FIG. 4c is a drawing of a cross-section of a first lens section for a lens array of the present invention along the long axis.

Please refer to FIG. 4b, which is a drawing of a second surface of a first lens section for a lens array of the present invention with the view in line with the optical axis, in combination with FIG. 6a and FIG. 6b, which are detail drawings of the same part as marked by C and D in FIG. 4a, respectively. These figures show the second surface 212 of the first lens section 210. The second surface 212 has a channel 212c down the center of the lens, and a second plurality of lens surfaces 214 are formed with their optical axes in line, spaced apart equally by one inter-axis distance 201. The line of the centers of the first plurality of lens surfaces 213 in this example embodiment is along the center line of the channel 212c. A plurality of ears 212e is formed along the edges 212a, 212b of the first lens surface 212 of the first lens section 210, such that the ears 212e are sized and spaced to mate with the notches 420 of the first spacer 221. The width of the first lens section 210 is substantially the same as the width of the first spacer 221. A first hole 212h is located and sized to mate with a second post 231p (see FIG. 7a, FIG. 7c, and FIG. 8b) of the second lens section 230 (see FIG. 7a, FIG. 7b, FIG. 7c, FIG. 8a, FIG. 8b, and FIG. 9). A surface of the first spacer 221 fits snugly against the faces of the edges 212a,212b with notches 420 mating to ears 212e so that the plurality of holes 410 are lined up with their centers on the optical axes of the second plurality of lens surfaces 214.

Figure 6C:
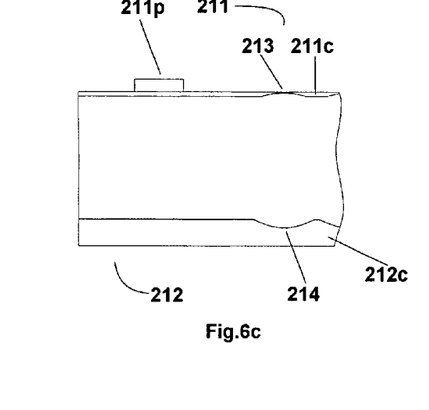
FIG. 6c is a drawing of a cross-section of a first end of a first lens section for a lens array of the present invention along the long axis.
Figure 6D:
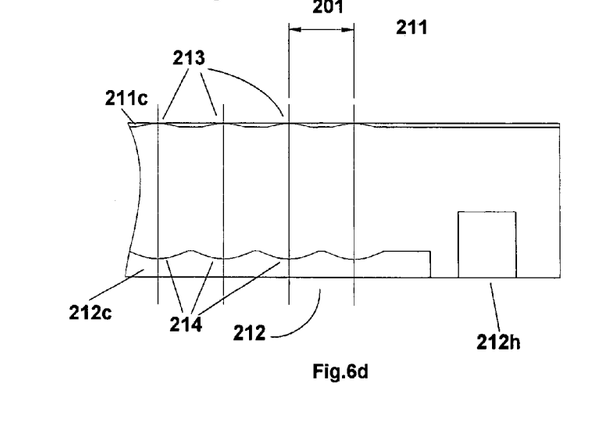
FIG. 6d is a drawing of a cross-section of a second end of a first lens section for a lens array of the present invention along the long axis.

Please refer to FIG. 4c, which is a drawing of a cross-section of a first lens section for a lens array of the present invention along the long axis, in combination with FIG. 6c and FIG. 6d, which are detail drawings of the same part for the details marked in FIG. 4c by E and F respectively. The cross-section view also shows the distal portion of the lens in the background. The cross-section cuts across the first plurality of lens surfaces 213 and the second plurality of lens surfaces 214, as well as the first post 211p and first hole 212h. The second edges 211b, 212b and ears 211e, 212e are visible in the background, behind the channels 211c, 212c. In FIG. 6c, a first post 211p for positioning a stop 240 is located on the first surface 211. Several first lens surfaces of the first plurality of lens surfaces 213 are located in the channel 211c. Several second lens surfaces of the second plurality of lens surfaces 214 are located in the channel 212c. In FIG. 6d, the first hole 212h is located in the second surface 212. The plurality of optical axes of the first plurality of lens surfaces 213 are inline with the plurality of optical axes of the second plurality of lens surfaces 214. Please note that the optical axes of the second plurality of lens surfaces 214 are aligned with the optical axes of the first plurality of lens surfaces 213 and that the number of lens surfaces in the first plurality of lens surfaces 213 is the same as the number of lens surfaces in the second plurality of lens surfaces 214.

Figure 5:
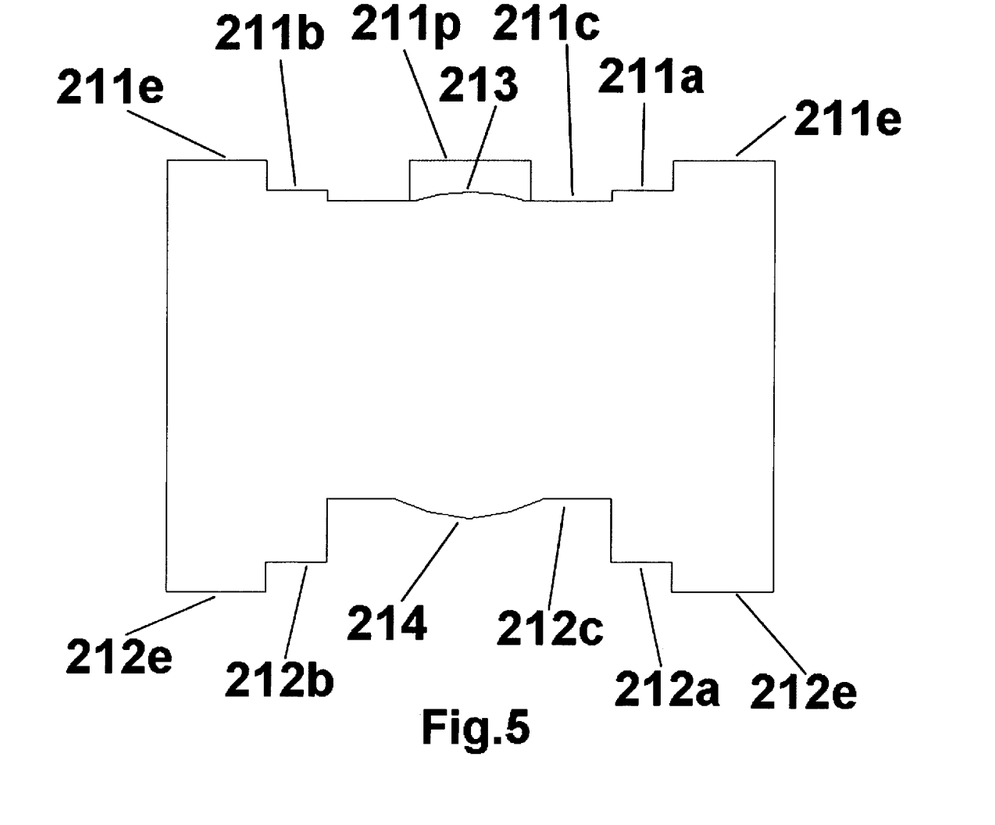
FIG. 5 is a drawing of a cross-section of a first lens section for a lens array of the present invention across a width of the first lens section.

Please refer to FIG. 5, which is a cross-section drawing of a first lens section for a lens array of the present invention across a width of the first lens section. This cross-section cuts along the optical axes of a pair of lens surfaces consisting of one of the first plurality of lens surfaces 213 in channel 211c and one of a lens surface of the second plurality of lens surfaces 214 in channel 212c, two ears of the plurality of ears 211e, and two ears of the plurality of ears 212e. Visible in the background is the first post 211p. Edges 211a and 211b, against which the stop 240 (not shown) will be placed when assembled, are shown. Edges 212a and 212b, against which the first spacer 221 will be placed when assembled, are also shown.

Figure 7A:
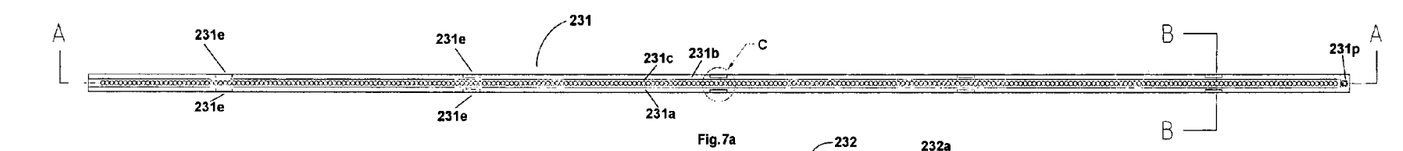
FIG. 7a is a drawing of a first surface of a second lens section for a lens array of the present invention with the view in line with the optical axis.
Figure 7C:
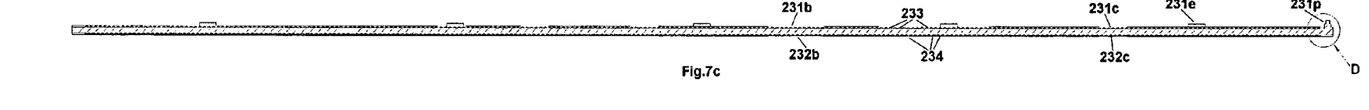
FIG. 7c is a drawing of a cross-section of a second lens section for a lens array of the present invention along the long axis.
Figure 8A:
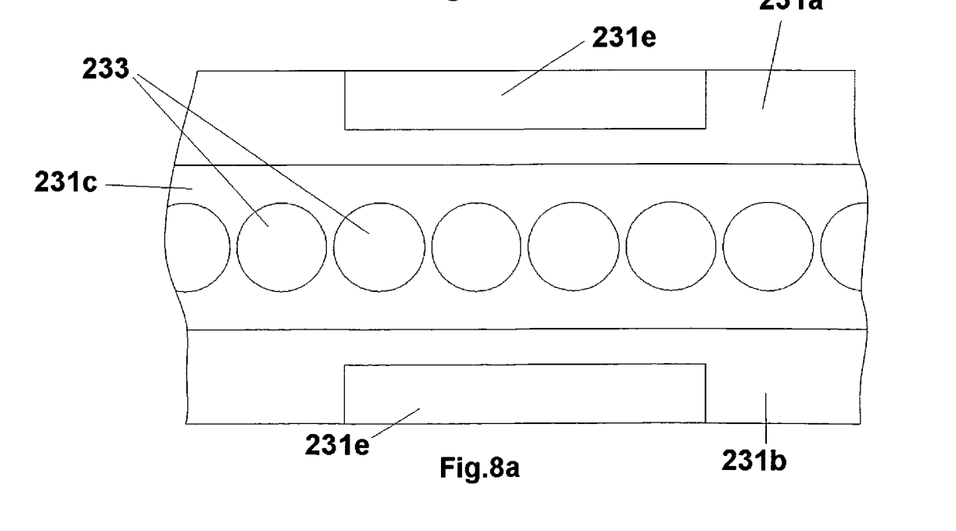
FIG. 8a is a drawing of a first surface of a second lens section for a lens array of the present invention with the view in line with the optical axis.

Please refer to FIG. 7a, which is a drawing of a third surface of a second lens section for a lens array of the present invention with the view in line with the optical axis, in combination with FIG. 8a, which is a detail of the same part for the region marked in FIG. 7a by C. Two section lines A-A and B-B are marked for use in FIG. 7c and FIG. 9 respectively. FIG. 7a shows the third surface 211 of the second lens section 230. The third surface 231 has a channel 231c down the center of the lens, and a third plurality of second lens surfaces 233 are formed with their optical axes in line, spaced apart equally by one inter-axis distance 201. The line of the centers of the third plurality of lens surfaces 233 in this example embodiment is along the center line of the channel 231c. A plurality of ears 231e is formed along the edges 231a, 231b of the second lens surface 231 of the second lens section 230, such that the ears 231e are sized and spaced to mate with the notches 410 of the first spacer 221, the notches 411 of the second spacer 222, and the notches 410 of the third spacer 223. In this embodiment, the ears 231e are substantially longer than the ears 212e on the first lens section 210, and mate with the notches on all three spacers, compared with the first lens section 210 only mating with the notches on the first spacer 221, but this is implementation-dependent and may vary in practice. The width of the second lens section 230 is substantially the same as the width of the first spacer 221, second spacer 222, and third spacer 223. A second post 231p is located at one end of the second lens section 230, sized and positioned to mate with the locating hole 430 of the first spacer 221, the locating hole 431 of the second spacer 222, the locating hole 430 of the third spacer 223, and the first hole 212h of the first lens section 210. This second post 231p is stepped down in diameter since the locating holes 430,431,430 are larger in diameter than the first hole 212h (see further discussion for FIG. 8b). A surface of the third spacer 223 fits snugly against the faces of the edges 231a,231b with notches 420 mating to ears 231e so that the plurality of holes 410 are lined up with their centers on the optical axes of the third plurality of lens surfaces 233.

Figure 7B:
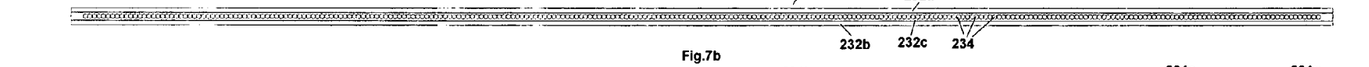
FIG. 7b is a drawing of a second surface of a second lens section for a lens array of the present invention with the view in line with the optical axis.

Please refer to FIG. 7b, which is a drawing of a second surface of a second lens section for a lens array of the present invention with the view in line with the optical axis. FIG. 7b shows the second surface 232 of the second lens section 230. The second surface 232 has a channel 232c down the center of the lens, and a fourth plurality of lens surfaces 234 are formed with their optical axes in line, spaced apart equally by one inter-axis distance 201. The line of the centers of the third plurality of lens surfaces 233 in this example embodiment is along the center line of the channel 232c. The edges to the sides 232a, 232b help protect the fourth plurality of lens surfaces 234 from handling damage during manufacture.

Figure 8B:
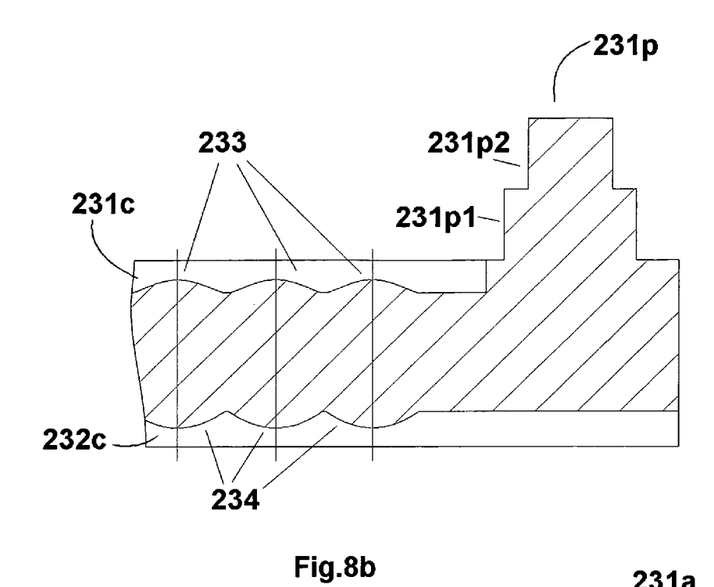
FIG. 8b is a drawing of a cross-section of an end of a second lens section for a lens array of the present invention along the long axis.
Figure 9:
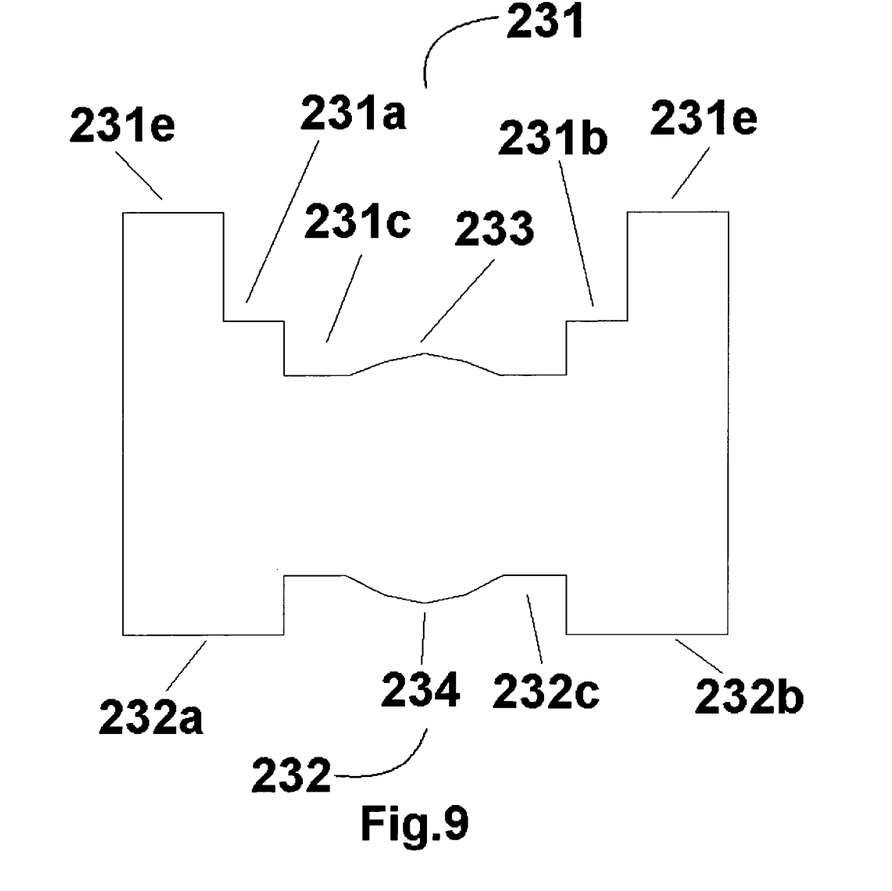
FIG. 9 is a drawing of a cross-section of a second lens section for a lens array of the present invention across a width of the second lens section.

Please refer to FIG. 7c, which is a drawing of a cross-section of a second lens section for a lens array of the present invention along the long axis, in combination with FIG. 8b, which is a detail of the same part as marked in drawing 7c by D. The cross-section view also shows the distal portion of the lens in the background. The cross-section cuts across the third plurality of lens surfaces 233 and the fourth plurality of lens surfaces 234, as well as the second post 231p, which has a section of a first diameter 231p1 and a section of a second diameter 231p2. The section 231p1 is larger in diameter than the section 231p2; the section 231 p1 is designed to mate with the locating holes 430,431,430 in the first spacer 221, second spacer 222, and third spacer 223 respectively. The section 231p2 is designed to mate with the first hole 212h of the first lens section 210. The second edges 231b, 232b and ears 231e are visible in the background, behind the channels 231c, 232c. Please note that the optical axes of the third plurality of lens surfaces 233 are aligned with the optical axes of the fourth plurality of lens surfaces 234 and that the number of lens surfaces in the third plurality of lens surfaces 233 is the same as the number of lens surfaces in the fourth plurality of lens surfaces 234.

Figure 11A:
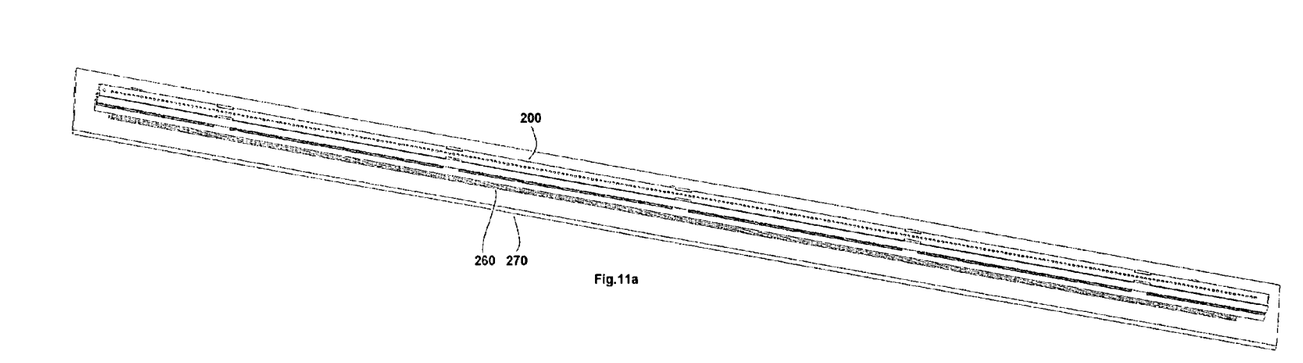
FIG. 11a is a perspective drawing of a lens array of the present invention.
Figure 12A:
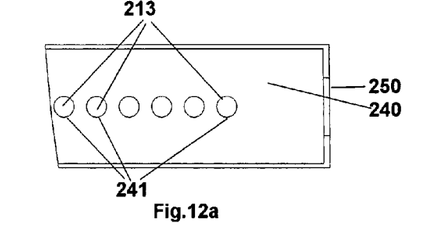
FIG. 12a is a top view of a lens array of the present invention in a frame mounted to a printed circuit board.
Figure 12B:
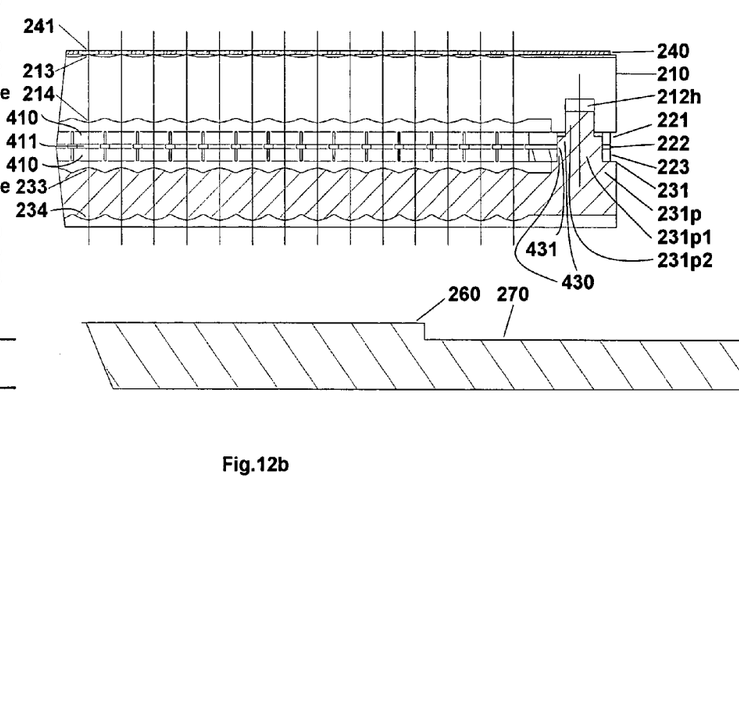
FIG. 12b is a cross-section drawing of a lens array of the present invention in relation to a printed circuit board, along the long axis.
Figure 12C:
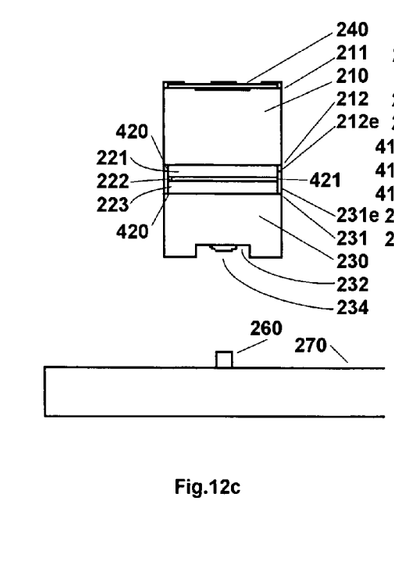
FIG. 12c is a cross-section drawing of a lens array of the present invention in relation to a printed circuit board, across the width of the lens array and printed circuit board.

Please refer to FIG. 11a, a perspective drawing of a lens array of the present invention, in combination with FIG. 12b and FIG. 12c, cross sections of a lens array of the present invention. The lens array 200 is assembled with a frame 250 (not shown) so that it is held at a fixed distance from a sensor 260 which is mounted on a printed-circuit board (PCB) 270. The stop 240 is positioned against the first surface 211 of the first lens section 210. The first spacer 221 is positioned with one face against the second surface 212 of the first lens section 210, with its notches 420 aligned with and held in place by the ears 212e, which extend only partially through the depth of the plurality of notches 420 of the first spacer 221; one face of the second spacer 222 is positioned against the other face of the first spacer 221; and then one face of the third spacer 223 is positioned against the other face of the second spacer 222; finally, the other face of the third spacer 223 is positioned against the third surface 231 of the second lens section 230. The second post 231p of the second lens section 230 fits its larger-diameter segment 231p1 through the locating holes 430,431,430 of the first spacer 221, second spacer 222, and third spacer 223 respectively; and the longer ears 231e of the second lens section 230 fit through the notches 420,421,420 of the first spacer 221, second spacer 222, and third spacer 223 respectively. The smaller-diameter segment 231p2 of the second post 231p fits into the first hole 212h of the second surface 212 of the first lens section 210. The ears 231e of the second lens section 230 abut the ears of the first lens section 210. The ears, posts, holes, and notches combine to hold the stop 240, the three spacers 221,222,223, and the two lens sections 210,230 in alignment.

Figure 11B:
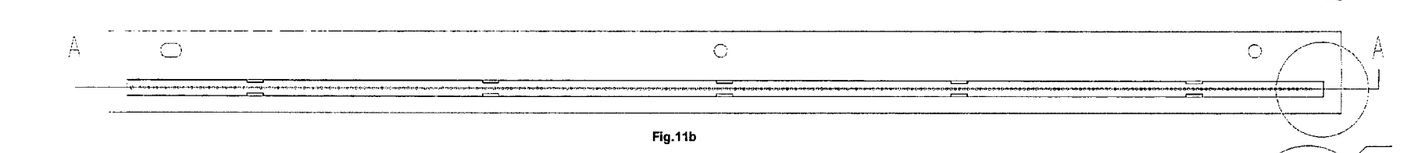
FIG. 11b is a drawing of a lens array of the present invention mounted to a printed circuit board, with the view in line with the optical axis.
Figure 11C:
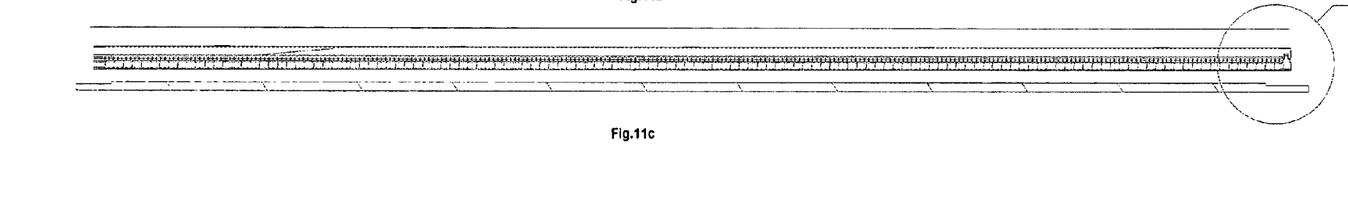
FIG. 11c is a cross-section drawing of a lens array of the present invention mounted to a printed circuit board, along the long axis.

Referring now to FIG. 11b, a top view of the lens array of the present invention assembled with a PCB, in combination with FIG. 12a, a detail view of the same assembly, as marked on FIG. 11b by B. A cross-section used in FIG. 11c and FIG. 12b is marked with the section line A-A. The lens array 200 is assembled inside a frame 250 which secures the lens to the PCB 270. The stop 240 is fitted against the first surface, and the first plurality of lens surfaces 213 of the first surface 211 of the first lens section 210 is visible through the plurality of holes 241 in the stop.

The lens surfaces of the first plurality of lens surfaces 213 have identical diameters and optical radii. The lens surfaces of the second plurality of lens surfaces 214 have identical diameters and optical radii. The lens surfaces of the third plurality of lens surfaces 233 have identical diameters and optical radii. The lens surfaces of the fourth plurality of lens surfaces 234 have identical diameters and optical radii. The four pluralities of lens surfaces 213,214,233,234 are identical in number and in the center-to-center spacing of the lens faces. The four pluralities of holes 410,411,410,241 from the first spacer 221, second spacer 222, third spacer 223, and stop 240 also are identical both in number and in the center-to-center spacing of the holes to the four pluralities of lens surfaces. As shown in FIG. 12b, the optical axes of the four pluralities of lens surfaces, and the centers of the four pluralities of holes, are all aligned, thus forming a single plurality of lens units. Each quad of four lens faces, one from each of the four pluralities above, positioned on the same optical axis forms a lens unit with a lens axis. One embodiment for imaging A4 sized paper at 300 dpi has 330 lens units. Note that there is no restriction on the configuration of the lens units; although this example embodiment shows an array in a single line, two or more lines of lens units can be used, organized in a square grid, or a rectangular grid, or hexagonally.

Please refer to FIG. 11c, a cross-section view of the lens array of the present invention assembled with a PCB, in combination with FIG. 12b, a detail view of the same assembly, as marked on FIG. 11c by C. A line at the top of FIG. 12b represents the object plane 280, which corresponds to a surface to be imaged. The stop 240 is proximal to the object plane 280, along with the first plurality of lens surfaces 213. The plurality of lens surfaces gathers and focuses light reflected from the surface so that the light travels in a divergent beam through the first lens section to the second plurality of lens surfaces 214. The light is generated by an external source. The first spacer 221, second spacer 222, and third spacer 223 block and absorb scattered light, while the pluralities of holes 420,421,420 allow desired, focused light to reach the third plurality of lens surfaces 233. The light then transits the second lens section and exits through the fourth plurality of lens surfaces 234, which focuses the light onto the sensor 260 mounted on the PCB 270.

In the preferred embodiment, the first lens section and second lens section are preferably made of a refractive, substantially transparent polymer. The spacer(s), stop, and frame are preferably made of an opaque polymer, preferably black, to absorb and/or block undesirable scattered or external light. One or more spacers can be used; using fewer spacers reduces manufacturing costs. Use of a frame is optional.

The dots per inch (DPI) resolution of the lens array is adjustable at design time by changing the optical radii, conic constant, or aspherical coefficients of the four lens groups. In contrast with the prior art rod lenses, the lens array can be designed to magnify the surface being imaged. The lens surface is defined by the formula:

$$z = \frac{cy^2}{1+\sqrt{1-(1+k)c^2y^2}} + A_2 y^2 + A_4 y^4 + A_6 y^6 A_8 y^8 + A_{10} y^{10} \quad \text{(eq 1)}$$

for each of the two lens sections.

The lens array thus provides a substantial improvement over the prior art by reducing manufacturing complexity and materials costs. Furthermore, the lens array makes it substantially less difficult to increase the resolution of a device using the lens array compared to the prior art.

It will be apparent to those skilled in the art that various modifications and variations can be made to the present invention without departing from the scope or spirit of the invention. In view of the foregoing, it is intended that the present invention cover modifications and variations of this invention provided they fall within the scope of the invention and its equivalent.

What is claimed is:

1. A lens array comprising:
   a first lens section, comprising a first surface and a second surface,
      said first surface comprising a first plurality of lens surfaces, said first plurality of lens surfaces forming a first plurality of optical axes, said first plurality of lens surfaces having substantially the same size and shape,
      said second surface comprising a second plurality of lens surfaces, said second plurality of lens surfaces forming a second plurality of optical axes, said second plurality of lens surfaces having substantially the same size and shape, such that each optical axis of the first plurality of optical axes is aligned with an optical axis of the second plurality of optical axes;

a second lens section, comprising a third surface and a fourth surface, said third surface comprising a third plurality of lens surfaces, said third plurality of lens surfaces forming a third plurality of optical axes, said third plurality of lens surfaces having substantially the same size and shape, said fourth surface comprising a fourth plurality of lens surfaces, said fourth plurality of lens surfaces forming a fourth plurality of optical axes, said fourth plurality of lens surfaces having substantially the same size and shape, such that each optical axis of the third plurality of optical axes is aligned with an optical axis of the fourth plurality of optical axes;

a spacer section, having a spacer thickness, comprising a first plurality of holes of circular cross section, said first plurality of holes having a first plurality of axes; and a stop, having a stop thickness, comprising a second plurality of holes, said second plurality of holes having a second plurality of axes;

such that each optical axis of the second plurality of optical axes is aligned with an optical axis of the third plurality of optical axes, and each axis of the first plurality of axes is aligned with an optical axis of the third plurality of optical axes, and each axis of the second plurality of axes is aligned with an optical axis of the first plurality of optical axes; and such that the stop is disposed against the first surface of the first lens section, the second surface of the first lens section is disposed against the first surface of the spacer section, and the second surface of the spacer section is disposed against the first surface of the second lens section.

2. The lens array of claim 1 where the first surface, the second surface, the third surface, and the fourth surface are substantially aspherical, and where the optical axes of the first plurality of optical axes are normal to a plane of the first surface, and where the optical axes of the first plurality of optical axes are arranged along a line such that a first distance between an adjacent pair of optical axes is substantially the same as another distance between any other adjacent pair of optical axes.

3. The lens array of claim 1 where the first lens section and the second lens section are formed from a substantially transparent polymer.

4. The lens array of claim 1 where the stop and the spacer section are formed from a substantially opaque black polymer.

5. The lens array of claim 1 where the first surface of the first lens section further comprises a first plurality of ears and a first locating post for positioning and holding in place the stop, and where the stop comprises a plurality of notches sized and positioned to mate with the first plurality of ears, and comprises a stop locating hole sized and positioned to mate with the first locating post.

6. The lens array of claim 1 where the second surface of the first lens section further comprises a second plurality of ears of a height less than the spacer thickness, and where the third surface of the second lens section further comprises a third plurality of ears of a height less than or equal to the height of the second plurality of ears minus the spacer thickness, and where the spacer section comprises a second plurality of notches sized and positioned to mate with both the second plurality of ears and the third plurality of ears, for locating and aligning the first lens section, the spacer section, and the second lens section.

7. The lens array of claim 1 where the second surface of the first lens section further comprises a lens locating hole, and where the third surface of the second lens section further comprises a locating post sized and positioned to mate with the lens locating hole, and where the spacer further comprises a spacer locating hole sized and positioned to mate around the locating post.

8. The lens array of claim 7 where:

the second surface of the first lens section further comprises a second plurality of ears;

the third surface of the second lens section further comprises a third plurality of ears;

the first spacer comprises a second plurality of notches sized and positioned to mate with the second plurality of ears, and comprises a first spacer locating hole sized and positioned to mate around the locating post; and the second spacer comprises a third plurality of notches sized and positioned to mate with the second plurality of ears, and comprises a second spacer locating hole sized and positioned to mate around the locating post.

9. The lens array of claim 1 where the spacer section is comprised of a first spacer, a second spacer, and a third spacer, where:

the first spacer has a first surface against which the second surface of the first lens section is disposed;

the first spacer has a second surface against which the first surface of the second spacer is disposed;

the second spacer has a second surface against which the first surface of the third spacer is disposed;

the third spacer has a second surface against which the first surface of the second lens section is disposed;

the first spacer comprises a plurality of holes of a substantially same first diameter, the plurality of holes having a plurality of axes, each axis of which lies on an optical axis of the plurality of optical axes of the plurality of second lens surfaces;

the second spacer comprises a plurality of holes of a substantially same second diameter, the plurality of holes having a plurality of axes, each axis of which lies on an optical axis of the plurality of optical axes of the plurality of second lens surfaces; and the third spacer comprises a plurality of holes of a substantially same third diameter, the plurality of holes having a plurality of axes, each axis of which lies on an optical axis of the plurality of optical axes of the plurality of second lens surfaces.

10. A lens array comprising:

a first lens section, comprising a first aspherical surface and a second planar surface, said first aspherical surface comprising a first plurality of lens surfaces, said first plurality of lens surfaces forming a first plurality of optical axes normal to the first aspherical surface, said first plurality of lens surfaces having substantially the same size and shape, said second planar surface comprising a second plurality of lens surfaces, said second plurality of lens surfaces forming a second plurality of optical axes, said second plurality of lens surfaces having substantially the same size and shape, such that each optical axis of the first plurality of optical axes is aligned with an optical axis of the second plurality of optical axes;

a second lens section, comprising a third aspherical surface and a fourth aspherical surface, said third aspherical surface comprising a third plurality of lens surfaces, said third plurality of lens surfaces forming a third plurality of optical axes, said third plurality of lens surfaces having substantially the same size and shape, said fourth aspherical surface comprising a fourth plurality of lens surfaces, said fourth plurality of lens surfaces forming a fourth plurality of optical axes, said fourth plurality of lens surfaces having substantially the same size and shape, such that each optical axis of the third plurality of optical axes is aligned with an optical axis of the fourth plurality of optical axes;

a spacer section, having a spacer thickness, comprising:

a first spacer, comprising a first surface, a second surface, and a plurality of holes of a substantially same first diameter, the plurality of holes having a plurality of axes, each axis of which lies on an optical axis of the second plurality of optical axes;

a second spacer, comprising a first surface, a second surface, and a plurality of holes of a substantially same second diameter, the plurality of holes having a plurality of axes, each axis of which lies on an optical axis of the second plurality of optical axes; and a third spacer, comprising a first surface, a second surface, and a plurality of holes of a substantially same third diameter, the plurality of holes having a plurality of axes, each axis of which lies on an optical axis of the second plurality of optical axes, where:

the first surface of the second spacer is disposed against the second surface of the first spacer;

the first surface of the third spacer is disposed against the second surface of the second spacer; and the second diameter is smaller than the first diameter, and the third diameter is substantially similar to the first diameter;

a stop, having a stop thickness, comprising a second plurality of holes, said second plurality of holes having a second plurality of axes;

such that each optical axis of the second plurality of optical axes is aligned with an optical axis of the third plurality of optical axes, and each axis of the first plurality of axes is aligned with an optical axis of the third plurality of optical axes, and each axis of the second plurality of axes is aligned with an optical axis of the first plurality of optical axes; and such that the stop is disposed against the first surface of the first lens section, the second surface of the first lens section is disposed against the first surface of the first spacer of the spacer section, and the second surface of the third spacer of the spacer section is disposed against the first surface of the second lens section.

11. The lens array of claim 10 where the optical axes of the first plurality of optical axes are arranged along a line such that a first distance between an adjacent pair of optical axes is substantially the same as another distance between any other adjacent pair of optical axes.

12. The lens array of claim 10 where the first lens section and the second lens section are formed from a substantially transparent polymer.

13. The lens array of claim 10 where the stop and the spacer section are formed from a substantially opaque black polymer.

14. The lens array of claim 10 where the first surface of the first lens section further comprises a first plurality of ears and a first locating post for positioning and holding in place the stop, and where the stop comprises a plurality of notches sized and positioned to mate with the first plurality of ears, and comprises a stop locating hole sized and positioned to mate with the first locating post.

15. The lens array of claim 10 where the second surface of the first lens section further comprises a second plurality of ears of a height less than the spacer thickness, and where the third surface of the second lens section further comprises a third plurality of ears of a height less than or equal to the height of the second plurality of ears minus the spacer thickness, and where the spacer section comprises a second plurality of notches sized and positioned to mate with both the second plurality of ears and the third plurality of ears, for locating and aligning the first lens section, the spacer section, and the second lens section.

16. The lens array of claim 10 where the second surface of the first lens section further comprises a lens locating hole, and where the third surface of the second lens section further comprises a locating post sized and positioned to mate with the lens locating hole, and where the spacer further comprises a spacer locating hole sized and positioned to mate around the locating post.

17. The lens array of claim 16 where:

the second surface of the first lens section further comprises a second plurality of ears;

the third surface of the second lens section further comprises a third plurality of ears;

the first spacer comprises a second plurality of notches sized and positioned to mate with the second plurality of ears, and comprises a first spacer locating hole sized and positioned to mate around the locating post; and the second spacer comprises a third plurality of notches sized and positioned to mate with the second plurality of ears, and comprises a second spacer locating hole sized and positioned to mate around the locating post.

* * * * *